United States Patent [19]

Miller et al.

[11] Patent Number: 4,730,700
[45] Date of Patent: Mar. 15, 1988

[54] PORTABLE TREE STAND

[76] Inventors: Stanley A. Miller, 527½ Rapidan Town, Mankato, Minn. 56001; Thomas E. Miller, R.R. 1, Box 178, Kilkenny, Minn. 56052

[21] Appl. No.: 15,338

[22] Filed: Feb. 17, 1987

[51] Int. Cl.⁴ .................. A01M 31/02; A45F 3/26
[52] U.S. Cl. ................................ 182/187; 108/152
[58] Field of Search ................ 182/187, 188; 108/152

[56] References Cited

U.S. PATENT DOCUMENTS

| | | | |
|---|---|---|---|
| 1,206,574 | 11/1916 | Miller | 182/187 |
| 3,116,808 | 1/1964 | Riley | 182/187 |
| 3,338,332 | 8/1967 | Brantly | 182/187 |
| 3,493,080 | 2/1970 | Ehlert | 182/187 |
| 3,749,200 | 7/1973 | Meyer | 182/187 |
| 3,885,649 | 5/1975 | Damron | 182/187 |
| 4,113,057 | 9/1978 | Bessinger | 182/187 |
| 4,428,459 | 1/1984 | Peck | 182/187 |
| 4,484,660 | 11/1984 | Baynum | 182/187 |
| 4,596,309 | 6/1986 | Venson | 182/187 |
| 4,601,364 | 7/1986 | York | 182/187 |

*Primary Examiner*—Reinaldo P. Machado
*Attorney, Agent, or Firm*—Herman H. Bains

[57] ABSTRACT

A portable tree stand includes a rigid, substantially rectangular lightweight platform having a flexible chain secured thereto for use in attaching and locking the platform to a tree trunk. A pair of elongate brace members are pivotally connected to the lower surface of the platform and are fixedly connected to a penetrating member, which penetrates the tree trunk when the tree stand is mounted on a tree. The platform has a recessed end and a pair of penetrating elements projecting therefrom, which facilitate positioning and stability of the platform. Carrying straps are provided to permit easy transport of the portable deer stand as a backpack.

2 Claims, 4 Drawing Figures

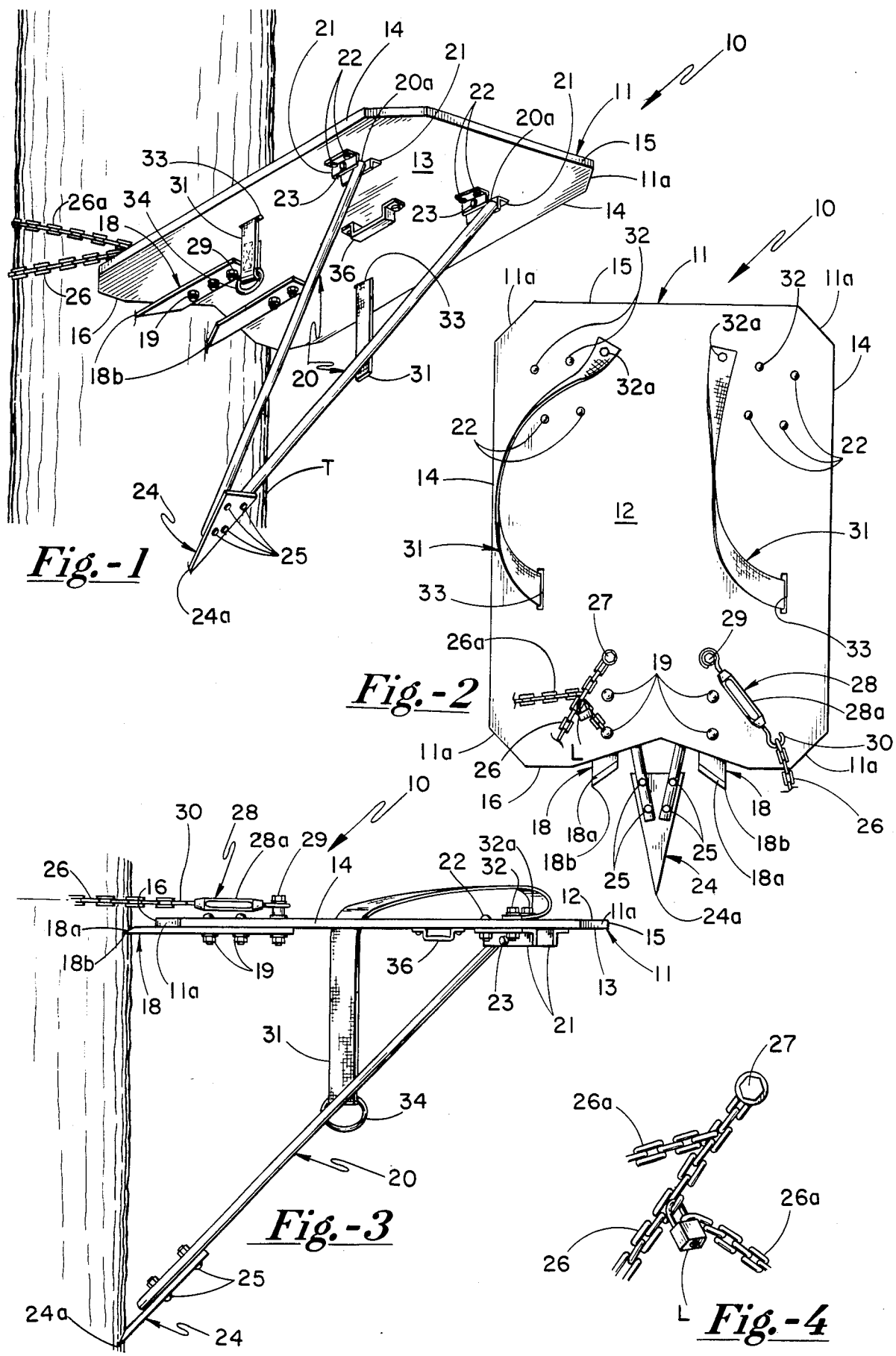

PORTABLE TREE STAND

This invention relates to a portable tree stand.

BACKGROUND OF THE INVENTION

Tree stands are commonly used by hunters, especially deer hunters, who hunt with bow and arrows. Certain prior art tree stands have been developed, but many of these prior art devices have certain disadvantages. In attempting to maintain maximum stability, the construction of these prior art devices has become complex and cumbersome, and they are not adaptable as backpacks for easy carriage.

For example, U.S. Pat. No. 4,484,660 discloses a deer stand, which employs a cable tensioning mechanism for attachment of the platform to the tree. U.S. Pat. No. 3,885,649 discloses a tree stand, in which the platform is made of expanded metal, and channel-shaped abutment members are used for obtaining proper contact with the tree trunk. U.S. Pat. No. 4,113,057 discloses a tree stand, which uses spring-urged piercing points for piercing the tree trunk, and also employs a complex spring-urged brace arrangement, which engages the tree trunk. U.S. Pat. No. 3,338,332 discloses a tree stand, which uses a clamping arrangement for attaching the stand to the tree trunk.

U.S. Pat. No. 4,428,459 discloses a tree stand, which utilizes a U-shaped metal band connected to a linkage arrangement for connecting the stand to the tree trunk. Finally, U.S. Pat. No. 3,749,200 discloses a tree stand, in which an opposed pair of beams are screwed into the tree trunk, and in which the braces are attached to the tree trunk by a cord.

Although these prior art devices may have been generally characterized as portable, none of them disclose lightweight deer stands, which may be attached to a tree, while assuring effective stability.

SUMMARY OF THE INVENTION

It is an object of this invention to provide a novel and improved portable deer stand, of simple and inexpensive construction, which may be readily attached to a tree trunk to provide a stable support for a deer hunter.

Another object of this invention is to provide a novel portable tree stand having penetrating elements secured to the platform and support braces, which cooperate with an attachment chain to firmly secure the tree stand to a tree trunk, and which may be releasably locked to the tree.

A further object of this invention is to provide a novel portable tree stand having carrying straps, which secure the support braces in a collapsed position and permit easy portability of the tree stand as a backpack.

FIGURES OF THE DRAWING

FIG. 1 is a bottom perspective view of the novel portable tree stand attached to a tree at a selected location;

FIG. 2 is a top plan view of the portable tree stand in the collapsed position;

FIG. 3 is a side elevational view thereof; and

FIG. 4 is a fragmentary plan view of the means for locking the portable tree stand to a tree.

DESCRIPTION OF THE PREFERRED EMBODIMENT

Referring now the drawings and, more specifically, to FIG. 1, it will be seen that one embodiment of the novel portable tree stand, designated generally by the reference numeral 10, is illustrated in attached relation with respect to the trunk of the tree T. The portable tree stand 10 includes a substantially flat, generally rectangular-shaped platform deck 11, which is preferably formed of a rigid material, such as wood or the like. The platform 11 has a substantially flat upper surface 12, a flat lower surface 13, longitudinal edges 14, an outer edge 15, and an inner edge 16. The inner edge 16 has a recess 17, and this recess is adapted to accommodate tree trunks of various sizes. The platform 11 also has beveled corners 11a to minimize the likelihood of injury to a user, which might result from sharp corners.

A pair of elongate, substantially flat positioning and penetrating elements 18 are secured to the lower surface 13 of the platform 11 adjacent the inner edge 16 thereof by suitable bolt and nut assemblies 19. The positioning and penetrating elements 18 are disposed in substantially parallel relationship and project from the inner edge of the platform closely adjacent the greatest degree of concavity of the recess 17. Each penetrating element 18 has a sharpened beveled end edge 18a, which terminates in an outer point 18b. It will be noted that the beveled or slanted edges 18a of the penetrating elements slant or converge inwardly towards each other. This particular arrangement also provides positioning surfaces with respect to a tree trunk to which the tree stand is attached.

The tree stand 10 also includes a pair of elongate, substantially straight tubular support braces 20, each being pivotally secured between a pair of L-shaped brackets 21 by a suitable pivot bolt 23. In the embodiment shown, each L-shaped bracket is secured to the lower surface 13 of the platform 11 by suitable nut and bolt assemblies 22. The L-shaped brackets 21 are located adjacent the outer edge 15 of the platform, and the tubular braces converge inwardly from the brackets into engaging relation with respect to each other. The inner ends of the braces are rigidly secured to a triangular-shaped, generally flat penetrating plate or member 24 by means of suitable nut and bolt assemblies 25. It will be noted that the penetrating plate 24 terminates inwardly in a penetrating point 24a.

When the tree stand 10 is attached to a tree, it will be noted that the braces 20 extend downwardly and inwardly towards the tree trunk at an angle of approximately 45 degrees with respect to the plane of the platform 11. The pivot connection 23 between the braces 20 and the L-shaped brackets 21 is such that downward pivoting movement towards the operative extended position is limited by engagement of the outer ends 20a of the support braces with the lower surface 13 of the platform. The pointed end 24a of the penetrating plate 24 will penetrate the tree trunk to which the portable tree stand is attached.

Means are provided for securing the tree stand to the trunk, and this means includes an elongate flexible chain 26, which has one end thereof secured to the upper surface 12 of the platform 11 by a suitable bolt and nut assembly 27. The chain 26 is adapted to be wrapped around a tree trunk, and the other end portion thereof is adapted to engage a conventional turnbuckle 28, which has one end thereof pivotally secured to the upper surface of the platform by a pivot bolt 29. The attachment chain 26 is engageable with the hook 30 of the turnbuckle to releasably secure the chain in embracing relation with respect to the tree trunk. In this regard, the threaded sleeve 28a may be rotated to reduce the overall length of the turnbuckle 28 in a well-known manner to thereby tighten the chain, when desired. It is pointed out that the attachment bolts for the chain 26 and turnbuckle 28 also serve to secure the penetrating elements 18 to the platform.

In order to facilitate carrying of the tree stand 10, the tree stand is provided with a pair of elongate carrying straps 31, each having one end thereof secured to the platform 11 by suitable nut and bolt assemblies 32. It will be noted that the attachment of the straps 31 is located adjacent, but spaced from, the outer edge of the platform 11. Each strap 31 is passed or threaded through one of a pair of elongate slots 33 in the platform, the slots being disposed substantially parallel to the associated longitudinal edges 14 of the platform.

One end of one of the straps is provided with a conventional buckle 34 to permit the straps to be secured together adjacent the lower surface of the platform. It will also be noted that the straps define loops 35, each of which is defined between the attachment bolt and the associated slot 33 for each strap. The loops 35 may be readily adjusted and the user will insert his arms through the loops so that the platform is carried as a backpack to and from the point of usage. A generally U-shaped handle 36 is secured to the lower surface of the platform deck 11 at a central location thereof. It will be noted that the handle 36 extends in a fore and aft direction, and is used to hold the platform deck in the proper position during mounting of the tree stand on a tree.

In use, the user will carry the portable tree stand as a backpack, along with the conventional hunting gear, such as the hunting bow and arrows, or the like. Because of the lightweight construction of the portable tree stand, it may be easily carried with a minimum of effort. When the tree stand is in the collapsed position, the braces 20 will be positioned to lie substantially closely adjacent the platform, and the flexible chain 26 may be wound upon the braces and penetrating elements 18 so that the chain is prevented from sliding downwardly. In this respect, the flat penetrating member will be disposed substantially parallel to the platform when the tree stand is in the carrying mode. The straps 31 will be secured together at the buckle and will extend around the braces so that the straps hold the braces in their collapsed position closely adjacent and parallel to the platform. The user, of course, will carry the platform as a backpack and the penetrating member of the braces will be disposed downwardly in this mode of use.

When the portable tree stand is to be mounted on a tree, the user or hunter will select a desirable tree, preferably a tree having a diameter of about 6 inches to 2 feet. It is preferred that the user use tree steps to ascend the tree to the desired height. It has been found that five such tree steps are sufficient in most instances. The user should also have a ⅜ inch wrench in order to tighten the turnbuckle 28.

The user will suspend the portable tree stand from his shoulders and will have loosened the turnbuckle 28 in preparation for the installation. The tree steps will be screwed into the tree as the user climbs to the desired height. It is preferred that a safety rope be used for attachment to the tree so that the user will have both hands free to mount the portable tree stand on the tree. The user will lean back and hold the tree stand by the handle 36 so that the platform is substantially parallel to the tree. The chain 26 will be wrapped around the tree and will be hooked to the turnbuckle 28.

The tree stand will then be allowed to drop to the horizontal position, which causes the penetrating elements 18 to sink into the tree. The turnbuckle 28 will then be tightened with a wrench, which may result in the front of the platform rising slightly. The user will then pull the front of the platform downwardly to a horizontal position, thereby causing the penetrating element 24a to penetrate the tree. When so installed, the platform should be horizontal with the penetrating elements 18 penetrating the tree to approximately ½ inch.

It has also been found that it is desirable to lock the stand to a tree to prevent theft when the user leaves the stand. In this regard, the chain 26a, as best seen in FIG. 4, has one end thereof attached to the chain 26 and has the other end thereof connected to a lock which is secured to the chain 26. The average time required to install the tree stand is from about 5 minutes to 8 minutes. When the tree stand is installed, as set forth hereinabove, it will be disposed in a horizontal position and will provide an extremely stable support. However, the user should use a safety rope while supported on the stand to minimize any likelihood of falling.

During removal of the tree stand, the chain will be disengaged and the platform will be tilted upwardly, thereby removing the penetrating elements 18 and penetrating plate from embedded relation with the tree. The tree stand may then be collapsed to the carrying mode.

From the foregoing, it will be seen that we have provided a novel lightweight tree stand, which provides an extremely steady support above the surface of the ground and, is therefore, ideal for deer hunters. It will also be noted that the novel tree stand will fit a wide range of tree trunks because of its unique construction.

Thus, it will be seen that we have provided a novel portable tree stand, which is not only of simple and inexpensive construction, but one which functions in a more efficient manner than any heretofore known comparable stand.

What is claimed is:

1. A portable tree stand, comprising:

a flat, generally rectangular-shaped platform having upper and lower surfaces, opposed longitudinal edges and end edges, one of said end edges having a recess therein for accommodating the trunk of a tree, a pair of elongate flat, laterally spaced apart substantially parallel penetrating elements, each being secured to said platform and projecting outwardly from the recessed end edge thereof, each penetrating element having an oblique beveled outer end defining a sharpened penetrating edge for penetrating a tree trunk and thereby preventing slippage of the platform, the oblique outer edge of each penetrating element converging inwardly towards the oblique outer edge of the other penetrating element, a pair of elongate substantially straight brace members, means pivotally securing one end portion of each brace to the platform adjacent the lower surface thereof, said braces being pivotable between the collapsed and extended positions, said braces, when in the extended position, extending downwardly at an angle of approximately 45 degrees from said platform towards the recessed end edge thereof, and, when in the collapsed position, being positioned closely adjacent said platform, said braces converging towards each other and towards said recessed end edge, a substantially flat penetrating member rigidly affixed to the convergent end portions of said braces and being disposed substantially parallel to the platform when the braces are in the collapsed position, an elongate flexible tree-engaging element having one end thereof secured to said platform adjacent the recess edge thereof and being adapted to engage a tree trunk, releasable locking means on said platform adjacent said recessed end edge and being engageable with said flexible member to secure the platform to a tree, said penetrating elements on said platform and said penetrating member on said braces penetrating the tree trunk when the flexible member is secured to the tree trunk, and a pair of carrying straps secured to said platform to permit ready support of the tree stand by a user as a backpack, said carrying straps extending around and engaging the braces to hold the same closely adjacent the platform when the tree stand is in the collapsed position.

2. The portable tree stand as defined in claim 1 and an elongate locking chain wrapped around the tree trunk and having one end thereof secured to said flexible member and having the other end thereof releasably locked to said flexible member.

* * * * *